No. 761,971. PATENTED JUNE 7, 1904.
A. C. KLOMAN.
APPARATUS FOR GENERATING ELECTRICITY.
APPLICATION FILED SEPT. 18, 1903.
NO MODEL. 3 SHEETS—SHEET 1.
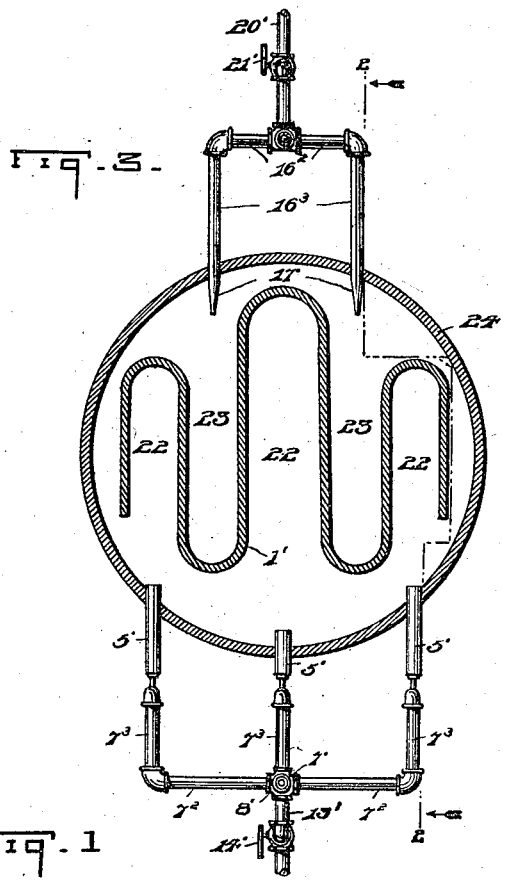
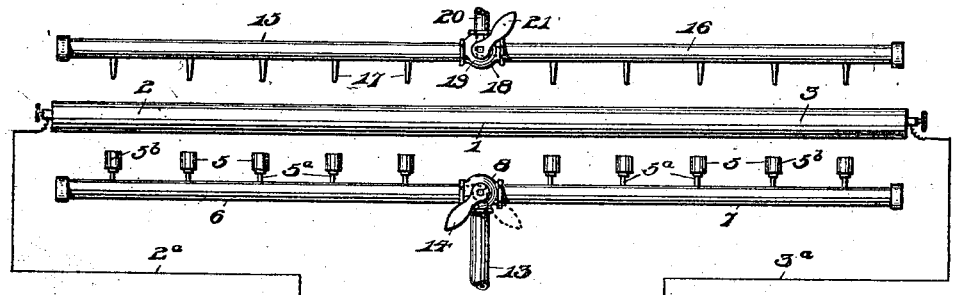
WITNESSES:
INVENTOR
Andrew C. Kloman,
By Wm. L. Pierce,
his attorney.

No. 761,971. PATENTED JUNE 7, 1904.
A. C. KLOMAN.
APPARATUS FOR GENERATING ELECTRICITY.
APPLICATION FILED SEPT. 18, 1903.
NO MODEL. 3 SHEETS—SHEET 2.
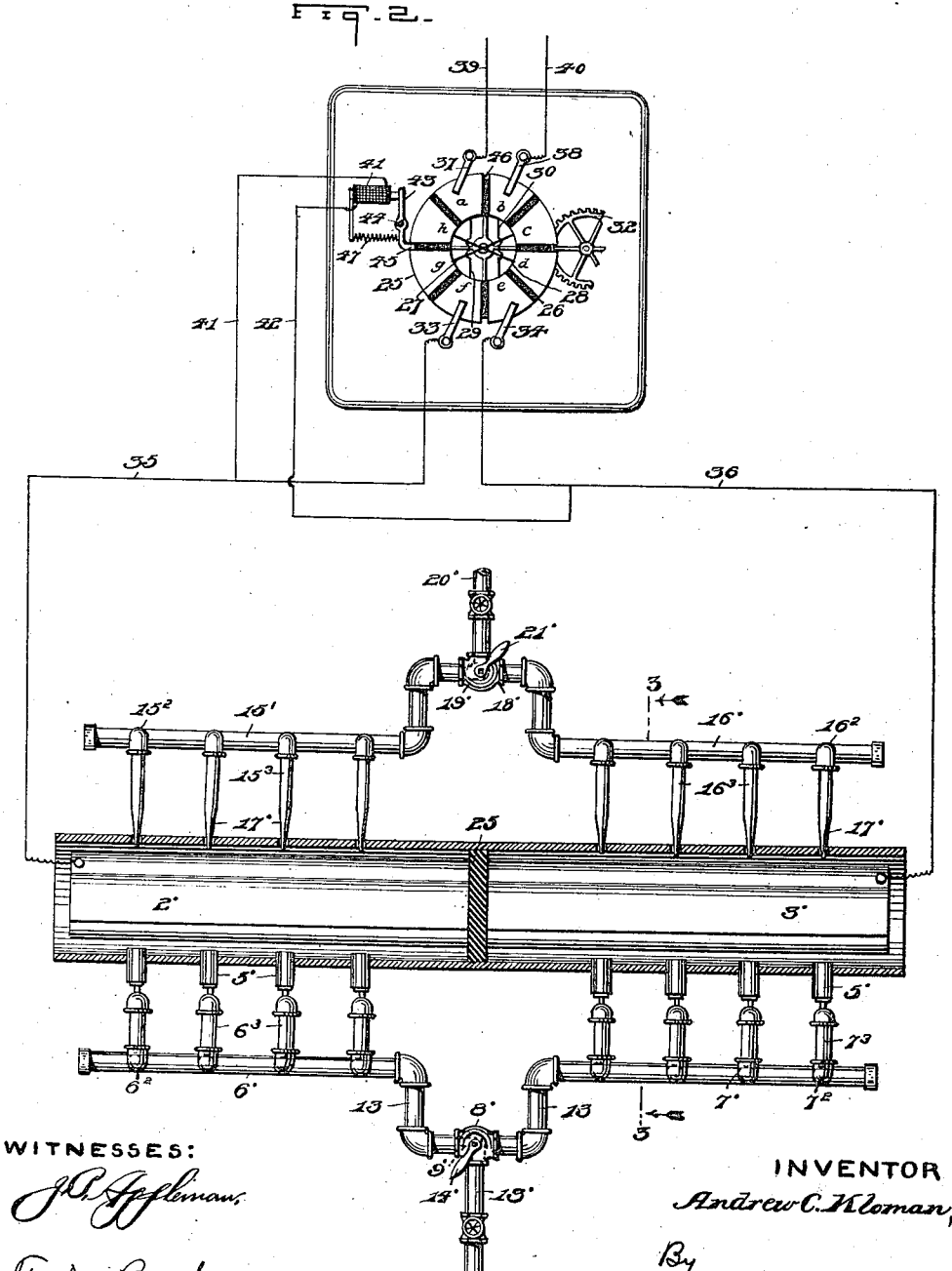
WITNESSES:
INVENTOR
Andrew C. Kloman,
By Wm. L. Pierce,
his attorney.

No. 761,971. PATENTED JUNE 7, 1904.
A. C. KLOMAN.
APPARATUS FOR GENERATING ELECTRICITY.
APPLICATION FILED SEPT. 18, 1903.
NO MODEL. 3 SHEETS—SHEET 3.
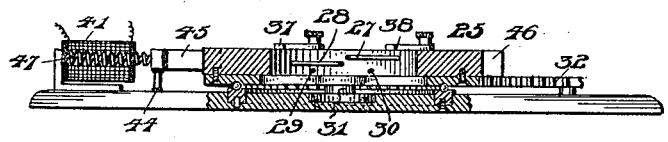
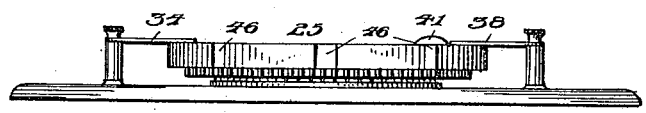
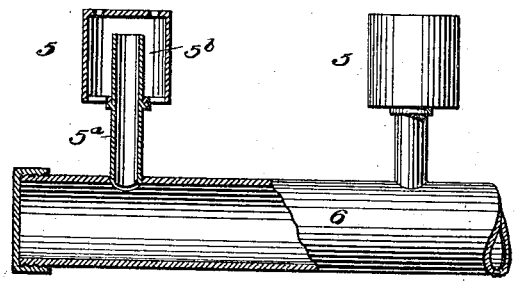
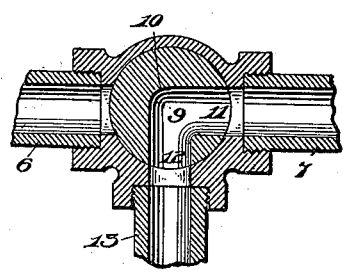
WITNESSES: INVENTOR
Andrew C. Kloman
By Wm. L. Pierce
his Attorney.

UNITED STATES PATENT OFFICE.

ANDREW C. KLOMAN, OF PITTSBURG, PENNSYLVANIA.

APPARATUS FOR GENERATING ELECTRICITY.

SPECIFICATION forming part of Letters Patent No. 761,971, dated June 7, 1904.

Application filed September 18, 1903. Serial No. 173,684. (No model.)

*To all whom it may concern:*

Be it known that I, ANDREW C. KLOMAN, a citizen of the United States, residing at Pittsburg, in the county of Allegheny and State of Pennsylvania, have invented or discovered new and useful Improvements in Apparatus for Generating Electricity, of which the following is a specification.

My invention relates to apparatus for generating electricity.

It is the object of my invention to provide a means whereby heat may be directly converted into electricity.

It is a fact that if a metal bar is first heated at one end, then heated at the opposite end and while the opposite or second end is being heated the first end is being cooled by means of any cooling agency, such as a jet of cold air, a current of electricity is generated—that is to say, that a current of electricity flows from the hot end of the bar of metal to the opposite end, which is being cooled. It is also a fact that any one of the well-known metals will produce a current of electricity under the conditions above described and, furthermore, that the character or quality of the current of electricity produced by the means above described changes with the character or kind of metal used. For instance, a bar of steel will produce a current of electricity of a much higher potential than a bar of copper of the same size and under the same conditions. By means of wire terminals carried from each end of the metal bar to a galvanometer the direction of the flow of the current of electricity is very readily determined, and in order to produce a constant or steady flow or current of electricity a number of bars or elements are connected to commutators by means of the terminals. The hot ends of the bars or elements are positive and the cold ends negative. A more detailed description of the commutators is given in another part of this specification.

Referring to the drawings, Figure 1 is a diagrammatic view of a simple form of my invention; Fig. 2, a diagrammatic representation of a different form which my invention may take, portions thereof showing mechanical details in plan and in section, the section being taken on the line 2 2 of Fig. 3; Fig. 3, a cross-section taken on the line 3 3 of Fig. 2; Fig. 4, a sectional detail of one of the gas-burners which I use; Fig. 5, a section of one of the reversing-valves. Fig. 6 is a vertical section of the commutator which I use, and Fig. 7 a side elevation of the same looking toward the left of Fig. 6.

Referring now to Fig. 1, 1 designates a bar of metal, preferably steel, having its ends 2 and 3 connected by wires $2^a$ and $3^a$ to the binding-posts of the galvanometer 4 of any approved type. I prefer that the bar be composed of a single or elementary metal. Below the bar 1 is a row of gas-burners 5, connected to the pipes 6 and 7, which are in alinement and joined together by a T 8. The T is provided with a two-way valve 9, having the passage 10, consisting of the two sections 11 and 12 at right angles to each other. The middle port of the T is connected to the gas-feed pipe 13. The valve 9 is turned by a handle 14. Each burner 5 consists of a short tube $5^a$, connected to the pipe 6 or 7, and of a mixer $5^b$, carried on the outer portion of the tube $5^a$. The mixer is a cylinder larger than the tube $5^a$ and has its bottom open and its top perforated. The gas as it issues from the pipe $5^a$ drags along with it air which enters the bottom of the mixer. The mixed gas and air pass through the perforated top of the mixer, above which combustion takes place. Above the bar 1 are the alined pipes 15 and 16, each provided with nozzles 17, pointing toward the bar. The pipes 15 and 16 are joined together by a T 18, which contains a valve 19 precisely like the valve 9. An air-feed pipe 20 is connected to the middle port of the T 18. The valve 19 is turned by the handle 21. The burners 5 may have pilot-lights of the usual kind, by which the burners will be automatically ignited when the gas is turned on through them, or they may be lighted by the use of electric sparks or otherwise.

The operation of the generator shown in Fig. 1 is as follows: The valve 8 being set by its handle 14, so that gas will be furnished to the burners 5 of the pipe 7, the said burners are lighted and the end 3 of the bar 1 becomes heated. During this time the valve 19 need not be set so as to feed air upon the end 2 of the bar when a reservoir of compressed air is used to feed to the pipe 20, or the air-compressors will not be started when the air is compressed as fast as needed. When the end 3 has become highly heated, the valve 9 will be turned so as to direct gas into the pipe 6 and to cut off the gas from the pipe 7. The burners of the latter pipe are then ignited. At the same time that the valve 9 is turned to direct gas into the pipe 6 the valve 19 is turned so as to direct cold air into the pipe 16, so that the end 3 of the bar, which has become highly heated, will be rapidly cooled, while the end 2 will be rapidly heated. When the end 2 becomes highly heated and the end 3 cooled, the valves 9 and 19 are turned so as to direct the gas again into the pipe 7 and the air into the pipe 15, whereby the highly-heated end 2 of the bar is rapidly cooled and the end 3 rapidly heated. The ends of the bar are alternately heated and cooled in the manner above described as long as the apparatus is to be in operation. It is found that when the heated end of the bar is being cooled and the cold end is being heated the galvanometer will indicate the presence of a current of electricity, the hotter end of the bar being positive and the cooler end negative. The current will diminish as the two ends of the bar approach the same temperature, and when the temperature of the ends becomes equal the current ceases; but as soon as the heating end of the bar becomes hotter than the cooling end the galvanometer indicates another current of electricity flowing in the opposite direction, which increases as long as the difference in temperature between the two ends increases. The current will continue in the same direction, but with falling potential after the difference in the temperatures of the ends of the bars become less and until the temperatures become equal.

Referring now to Figs. 2 and 3, it will be seen that the principles above set forth are also embodied therein. The bar 1' is a long metal plate, corrugated so as to present three grooves 22 on the lower side and two grooves 23 on the upper side. The corrugated plate 1' is inclosed in the cylinder 24 of fire-brick or other refractory material, which is divided into two chambers by the refractory partition 25. The partition prevents the heat acting on one end of the plate or bar from affecting the temperature of the end being cooled and forms a support for the metal bar or plate. Arranged below the cylinder or inclosure 24 are the gas-pipes 6' and 7', connected to opposite ends of the T 8', which includes the valve 9', actuated by the handle 14'. The pipes 6' and 7' are provided on each side with branch pipes $6^2$ and $7^2$, which carry vertical pipes $6^3$ and $7^3$. The burners 5' are on the upper ends of the latter pipes and extend through holes in the cylinder, so located as to direct the burning gas into the grooves or hollows 22. The gas-feed pipe 13' is connected to the middle port of the T. Above the cylinder 24 are the pipes 15' and 16', which are connected to the T 18', provided with the valve 19', having the handle 21'. The pipes 15' and 16' have on each side branch pipes $15^2$ and $16^2$, which support vertical pipes $15^3$ and $16^3$. The air nozzles or jets 17' are on the lower ends of the pipes $15^3$ and $16^3$ and extend through holes in the cylinder 24, so as to direct air into the grooves or hollows 23. The air-feed pipe 20' is connected to the middle port of the T. The valves 9' and 19' are like the valves 9 and 19. 25 is a rotary switch element of the commutator, which I have devised for use with my generator in order that the oppositely-flowing currents carried from the opposite ends of the plate or bar 1 or 1' may be caused to flow in a uniform direction. The rotary element or switch 25 is a wheel composed of eight segments $a$, $b$, $c$, $d$, $e$, $f$, $g$, and $h$ of good conducting metal arranged in a circle and separated by strips of vulcanite, mica, or other insulating material 26. The diametrically-opposite segments $c\ g$ and $d\ h$ are connected in pairs by the crossed wires 27 and 28, respectively, and the segments $a\ f$ and $b\ e$ are connected in pairs by the parallel wires 29 and 30, respectively. The wheel is rotated on the pin 31 by means of a spring or other motor, one wheel 32 thereof only being shown, which gears with teeth on the wheel 25. 33 and 34 are switch contact-springs, which constantly bear upon the wheel 25 and are arranged so as to bear upon adjacent segments $a\ b\ c$, &c., the spring 33 being connected to the end 2' of the plate 1' by the wire 35 and the spring 34 to the end 3' of said plate by the wire 36. 37 and 38 are another pair of springs in contact with adjacent segments of the wheel 25, the spring 37 being diametrically opposite the spring 34 and the spring 38 diametrically opposite the spring 33. The springs 37 and 38 are connected to the mains 39 and 40, respectively. 41 is an electromagnet connected by the wires 41 and 42 across the wires 35 and 36. 43 is the armature thereof, pivoted at 44 and having a catch, lug, or tooth 45, which fits notches 46 between the alternate pairs of adjacent segments of the wheel or switch 25, notches being between opposite ends of the wires 29 and 30. 47 is a spring which opposes the action of the magnet 41.

The operation of the mechanism shown in Figs. 2 and 3 is as follows: One end, as 3', of the plate 1' is heated, as described in connection with Fig. 1. When this end is hot enough, the gas is turned to heat the end 2', and cold air is directed upon the end 3'. A current of electricity will now be found to be flowing from the end 3' out over the wire 36 to the spring 34, the segment $e$, the wire 30, the segment $b$, the spring 38, and the main 40. The return-circuit is from main 39 over the spring 37, the segment *a*, the wire 29, the segment *f*, the spring 33, and the wire 35 to the end 2' of the plate 1'. The current will continue to flow with diminishing potential, while both ends of the plate are approaching the same temperature. It will be noticed that a part of the generated current passes through the magnet 41 and that when the current becomes too weak to resist the spring 47 the latter will withdraw the tooth 45 from the notch 46, whereupon the wheel 32 will under the influence of its driving power (not shown) turn the wheel 25 or switch anticlockwise. Before the next notch 46 comes under the tooth 45 the valves 9' and 19' have reversed the gas and air and a new current of opposite polarity to the former current has been generated, so that when the next notch 46 and the tooth 45 register the magnet will be already energized to cause the wheel 25 to be again locked. The segments *g* and *h* take the former position of the segments *a* and *b*, and the segments *c* and *d* take the former positions of the segments *e* and *f*; but as the segments are now connected in pairs by crossed wires instead of parallel wires the current though reversed in the wires 35 and 36 will flow out over wire 40 and return by wire 39, as before. The circuit is as follows: from the end 2' of the plate 1' over the wire 35, the spring 33, the segment *h*, the wire 28, the segment *d*, and the spring 38 to the main 40. The return current flows from the main 39 over the spring 37, the segment *c*, the wire 27, the segment *g*, the spring 34, and the wire 36 to the end 3' of the plate 1'.

In order to increase the voltage to any amount desired, it is only necessary to multiply the number of elements or plates with their adjuncts, as required, the elements being connected in series or in multiple, according to the requirements.

I have shown the plate 1' with a certain number of grooves; but the number may be varied. In fact, the grooves may be omitted, if desired, or other forms of plates or bars may be used. If desired, the bars might be rings or loops.

I have shown specific mechanism for other details of my invention; but I do not desire to be limited to the same, as I believe I am the first to generate by any means whatever currents of electricity by alternately heating and cooling the ends of a bar, plate, or their equivalent.

Having described my invention, I claim—

1. A generator of electricity, having in combination a metallic element and means for simultaneously heating and cooling different portions thereof, and for reversing the conditions so as to simultaneously cool the heated portion and heat the cooled portion.

2. A generator of electricity, having in combination a metallic element, a set of gas-burners for different portions thereof, a set of air-jets for each of said portions, pipes conveying gas to the burners and air to jets, and valves in said pipes so constructed that gas and air may be directed so as to simultaneously heat and cool said different portions, and to reverse the gas and air so as to simultaneously cool the heated portion and heat the cooled portion.

3. A generator for electricity, having in combination, a metallic element means for simultaneously heating and cooling different portions thereof, and for reversing the conditions so as to simultaneously cool the heated portion and heat the cooled portion, and a commutator for rectifying the generated currents of electricity.

Signed at Pittsburg this 15th day of September, 1903.

ANDREW C. KLOMAN.

Witnesses:
F. N. BARBER,
A. M. STEEN.